Patented Oct. 10, 1950

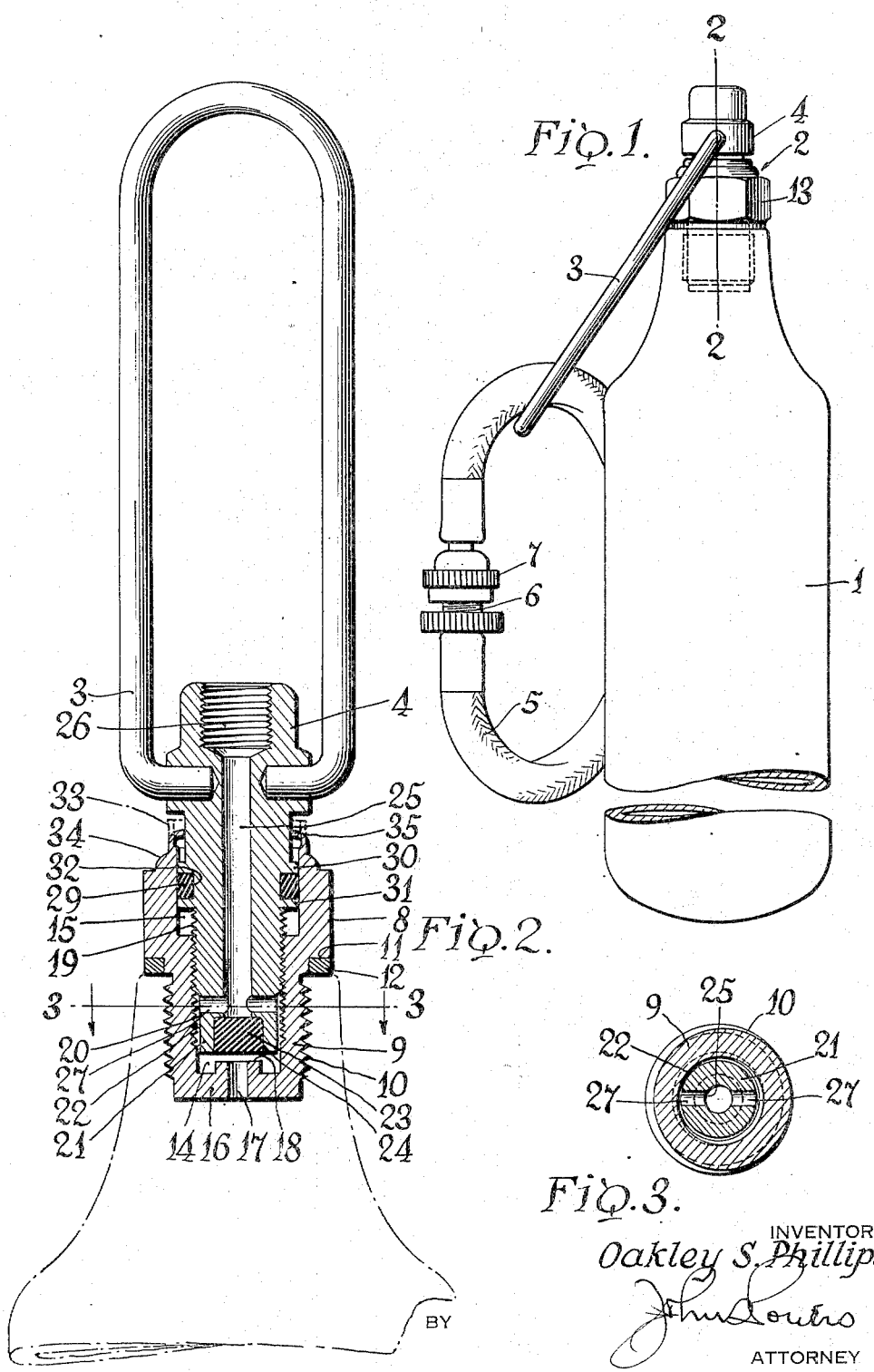

2,525,617

UNITED STATES PATENT OFFICE 2,525,617

VALVE ASSEMBLY FOR USE WITH METAL FLASKS CONTAINING GAS UNDER HIGH PRESSURE

Oakley S. Phillips, North Tonawanda, N. Y.

Application April 30, 1947, Serial No. 745,086

1 Claim. (Cl. 222—400)

This invention relates to improvements in valve assemblies for use with metal flasks (or equivalent confining bodies or systems) containing a gas under high pressure. Generally speaking the uses of metal flasks involve gas pressures within a range, at room temperature, of 800 to 1800 pounds, depending on the particular fluid and intended purpose of use.

The standard features of the valve assemblies to which the improvements are directed are a casing directly attached to the flask and having at its bottom an opening for the flow of the fluid into or from the flask and a valve seat associated with the opening and a tubular stem open at its outer end and at its inner end carrying a valve element for cooperation with the seat, the stem having threaded engagement with the casing whereby its axial (opening and closing) movement relatively to the valve seat is effected by turning it in the appropriate direction about its axis.

In accordance with standard practice the flasks and their associated valve assemblies are permanently combined as a unit (through the attachment of the casing to the flask) wherein the tubular valve stem, through which the flask is charged or discharged, projects nozzle-wise beyond the end of the flask. Such units are used for sundry purposes, e. g., the inflation of pneumatic devices such as tires and life rafts, the extinguishment of small fires, the fluid for these uses being carbon dioxide, the delivery of gases, e. g., nitrous oxide, for anesthetic purposes, and the delivery of oxygen for special purposes, e. g., medical or resuscitation.

In such units, with the valve element normally closed, the fluid will be maintained for an indefinite period under effective pressure. It is, however, of great importance, in order to prevent by-passing and consequent waste of the fluid in charging or discharging, that a second seal be maintained unimpaired in all positions of the valve element, that is to say, throughout the movement of the valve stem between closed position and any degree of open position. As a matter of commercial production these combined results have not heretofore been satisfactorily achieved. In the effort so to achieve them experiments have been made, for the purpose of the second seal, with the packing ring taught by the patent to Christensen, No. 2,180,795 of November 21, 1939, that is to say, a continuous resilient ring of annular outline and annular solid cross section closely fitting within an annular channel provided in the part by which the packing ring is carried and closely engaging the adjacent wall of the associated relatively movable part. However this effort has not heretofore been commercially successful.

I have ascertained that the reasons for this failure are that virtually perfect guiding of the tubular stem with relation to its companion casing part is necessary in order to avoid deformation and consequent permanent functional impairment of the Christensen type packing ring, and that, in the experimental construction above described, such guiding cannot be obtained with any degree of manufacturing consistency by the ordinary (screw machine) operation, owing to the fact that the limits of tolerance (under the heavy pressure at which the fluid must be maintained in the flask) are so extremely minute (of the order of .00025") that they cannot be achieved within the requirements of economically sound commercial production; and that the attainment of such mechanically perfect guidance fails to yield practical results, this for the reason that the refrigerating effect of the discharging gas so alters the relative dimensions of the associated parts as to cause binding, i. e., "freezing," of the valve stem whereby it cannot be moved for purposes of practical use.

When the minute limits of tolerance are exceeded, as they inevitably are in the majority of cases, despite the most skilled and careful work, the valve stem, although having threaded connection with the interior of the casing, nevertheless has seal destructive oscillating play within an operative range of its axial movement toward or away from the valve seat as effected by its rotative movement in connection with its threaded mounting. Stated otherwise, my shop experiments have shown that despite the threaded connection of the valve stem with the interior of the casing, there is inevitably in the great majority of cases a certain looseness of fit which, under the high pressures involved, results in oscillating play or canting, sensually imperceptible, of such degree that the packing ring is at once both bunched and stretched in connection with the rotation of the valve stem, alike for the purposes of charging or discharging, with resultant permanent distortion of the packing ring, permanent impairment of its sealing effect and permanent liability of by-passing of the high pressure fluid. Such bunching and stretching of the packing ring is always in such degree that by-passing of the gas will result, the by-passing being of a degree which substantially impairs the efficiency of the unit.

I have also ascertained that if the minute tolerance required for perfect guiding be achieved the fit of the valve stem within the casing is so close that the refrigerating effect of the discharging gas causes such shrinkage of the valve casing, with resultant contraction of its inner circumferential face, as to result in the binding or "freezing" of the valve stem against manual movement. In other words the valve stem is "frozen" in open position and control of the quantity of gas discharged, as well as control of the utility of the device, is lost.

The object of the invention is to provide a valve assembly having the characteristics above described wherein, without substantial increase of manufacturing cost per unit, destructive oscillating play or canting of the valve stem is positively prevented, the valve stem is exactly guided and confined in the axial direction in its combined rotatable and axial movement, and at the same time the second seal is always, and in all positions of the valve stem, fully effective, regardless of variations in the fit of the valve stem in the casing. Thereby the above noted objections and failures are uniformly completely overcome.

In the accompanying drawing:

Figure 1 is an elevation of a unit composed of a flask and a valve assembly in accordance with the invention.

Figure 2 is a central vertical sectional view on the line 2—2 of Figure 1 of the improved valve assembly.

Figure 3 is a cross section on the line 3—3 of Figure 2.

The flask 1 and the valve assembly 2 are an operative unit in accordance with standard practice. The bail 3, pivoted to the valve stem 4 and by means of which it is turned, is also in accordance with standard practice. For a number of purposes of use a short hose section 5 is desirable or necessary, this section having at one end a threaded male element 6 and at its opposite end a swivelled threaded female element 7. For normal carrying or storage it is convenient, and in accordance with standard practice, to hang the hose section 5 upon the bail 3, forming the hose section into a loop which is completed by the mutual engagement of the elements 6 and 7.

The valve assembly 2 includes the stem 4 aforesaid and a casing 8 which is permanently attached to the flask. For this purpose the casing 8 is formed with a shank 9 externally threaded as at 10, for engagement with internal threads in the neck of the flask 1. Adjacent the shank 9 the casing 8 is formed with a rabbet which provides an annular outwardly projecting shoulder 11 for cooperation with the adjacent end face of the flask neck to clamp an external sealing gasket 12. The externally projecting body part of the casing 8 is formed, beyond the shoulder 11, with a flat sided, e. g., hexagonal, section 13 to which a wrench may be applied in order to engage the casing with the flask neck or to remove it from the flask neck.

The casing 8 is formed with co-axial inner and outer chambers 14 and 15, the inner chamber 14 being of less diameter than the outer chamber 15 and the latter being open to the upper or outer end of the casing. At its lower or inner end the casing is formed with a bottom wall 16 having a central axial passage 17 which communicates with the interior of the flask and with the interior of the chamber 14. Within the chamber 14 the section 16 is provided with an annular valve seat 18 concentric to the passage 17.

The valve stem 4 is formed in an intermediate portion with external threads 19 for cooperation with internal threads 20 on the adjacent cylindrical wall of the chamber 14. Inward of, or below, the threads 19, the valve stem has a portion 21 of reduced diameter whereby an intervening clearance 22 is provided between the valve stem and the wall of the chamber 14. The valve element includes the valve stem portion 21 and a sealing body 23 for direct cooperation with the seat 18. In the construction shown the valve stem portion 21 is formed with a central recess 24 open to its flat face and in which the body 23 is fitted.

The valve stem 4 is of tubular construction, that is to say, it is formed with a central axial passage 25 which extends from the body 23 to the outer end of the valve stem and preferably terminates in an enlarged portion 26 internally threaded for cooperation with the male element 6 or an equivalent part. The passage 25 communicates by means of radial ports 27 with the clearance 22. The valve being open in suitable degree, that is to say, the sealing body 23 being suitably distant from its seat 18, the flow of fluid, in charging or discharging, is through the continuous path provided by the passage 17 in the casing bottom 16, the clearance 22, the radial valve stem ports 27 and the axial valve stem passage 25. In the closed position of the valve the body 23 in cooperation with the seat 18 provides a seal against the escape of fluid from the flask.

The second seal is between the valve stem and the inner circumferential face of the casing 8 and is effective in all positions of the valve stem. It consists of a packing ring 29 having sealing engagement with an annular surface of the valve stem and with the inner circumferential face of the casing 8. The ring 29 is located in the chamber 15, is of the Christensen type as above identified and is preferably carried by the valve stem. For this purpose the valve stem is formed above and adjacent the threaded portion 19 with annular flanges 30 and 31 in parallel planes and which delimit an annular channel 32, the packing ring being fitted in this channel in closely adjoining relationship to its upper and lower walls and bearing with effective sealing pressure against the annular base of the channel and the inner circumferential face of the chamber 15.

In manufacture, the flanges 30 and 31 are formed as parts of a continuous annular projection and the channel 32 is cut in this projection, leaving upper and lower portions thereof which constitute the flanges. The outer circumferential face of this projection is machined to fit within the cylindrical wall of the chamber 15 as closely as possible consistent with the requisite freedom of movement of the valve stem. However the limit of tolerance necessary for the flanges 30 and 31 to provide an accurate guide for the valve stem in order to hold it against oscillating play or canting during the movement of the valve stem and under the high pressures employed cannot be consistently achieved. In fact in a majority of cases this ideal limit of tolerance is exceeded despite the most careful manufacture consistent with economic production. The resultant canting of the valve stem, sensually imperceptible, causes the sealing ring, in connection with the turning movement of the valve stem, in part to be bunched or compressed in the peripheral direction and in part to be stretched. When so bunched or stretched the sealing ring does not resume its normal tension in the peripheral direction and is thereby permanently impaired. Extended degree, or repetitions, of the turning movement of the valve stem aggravates the condition. In any case the result of the impairment of the sealing ring is that it does not function effectively as a seal when the valve is opened and gas will by-pass around the sealing ring in a degree which will substantially reduce the amount of gas that would otherwise be discharged, as intended, through the passage 25. Such by-passing also causes waste of gas at the source in connection with the charging or recharging of the flask.

The practically unattainable perfection of manufacture which, under normal temperature conditions, will enable the flanges 30 and 31 to exercise an efficient guiding function takes no account of the changes of relative dimensions of the parts consequent to the refrigerating effect of the discharging gas. In other words, if the fit of the flanges 30 and 31 in the casing be ideal under normal temperature conditions the refrigerating effect of the discharging gas will cause such contraction of the casing 8, and shrinkage of its internal diameter, as will result in the binding or "freezing" of the valve stem against further manual movement.

In order to overcome the above objections the casing 8 is provided at its upper end with an inwardly projecting flange 35 which overhangs the flange 30 and, incidentally, provides a stop for limiting the outward movement of the valve stem; and which, throughout its circumferential edge, has guiding contact with the valve stem. For the provision of the flange 35 the casing 8, in the construction disclosed, is formed at its upper end with an originally cylindrical extension 33 (indicated by broken lines in Figure 2) of such thinness that its metal can, for the purposes in view, be appropriately shaped by either a spinning or crimping operation. The extension 33 adjoins the inner circumferential face of the casing and projects from a thickened annular reinforcing portion 34 at the upper end of the casing. In assembling, as the valve stem is fitted in the casing 8, with its flanges 30 and 31 within the inner circumferential face of the casing, the extension 33 affects the appropriate initial uniform transverse compression of the packing ring 29; and, thereafter, by a spinning or crimping operation the extension 33 is bent inward through an appropriate arc and at the same time its open end is reduced in diameter to conform to the external diameter of the valve stem. The result of these operations is that the extension 33 is utilized to provide the inwardly projecting flange 35 in a plane at right angles to the axis of the valve stem, the inner circumferential edge of the flange 35 uniformly contacting the outer circumferential face of the valve stem.

The essential function of the flange 35 is to provide a second, and positive, guide for the valve stem, the first guide being provided by the cooperating threads 19 and 20 of the valve stem and casing 8. By virtue of the double guide thus provided and the accuracy of the flange 35 as the second guide canting or oscillating play of the valve stem in its combined rotative and axial movements is entirely eliminated with the result that bunching or stretching, and consequent impairment, of the packing ring is eliminated, regardless of the looseness of fit of the flanges 30 and 31 with the casing 8, that is to say regardless of the departure of the fit of said flanges within the casing from ideal limits of tolerance. It follows that the limit of tolerance required for the flanges 30 and 31 to function as perfect guides for the valve stem may (as they must to avoid the objection of the refrigerating effect of the gas) be safely disregarded, thereby to eliminate any possibility of the binding of the valve stem. Since the bunching and stretching of the ring 29 during the rotative and axial movement of the valve stem is eliminated the ring will at all times efficiently serve its sealing function and loss of gas, alike from the flask by by-passing during discharging or from the source by by-passing during charging or recharging, is prevented.

I claim:

A valve assembly for use with a flask containing gas under high pressure as herein set forth and of the type which comprises (1) a valve casing fitted in the neck of the flask and formed with a bottom wall having a passage to establish communication between the flask and the casing and, within the casing, also having an annular valve seat concentric to the passage, (2) a valve stem arranged coaxially within the casing and provided with (a) intermediately located threads for cooperation with corresponding threads on the casing, (b) a valve element at its inner end for normal engagement with said seat, (c) a portion of reduced diameter located inwardly beyond its threads and affording a clearance relatively to the casing, the clearance being in communication with said passage, and (d) an axial passage extending to its outer end and communicating with said clearance, the valve stem having a portion which projects outwardly beyond the valve casing and the valve stem in its operation to open and close the valve element having components of axial and rotatable movement relatively to the casing, and (3) means located at one side of the cooperating threads for the purpose of establishing in any position of the valve stem a seal between the valve stem and the casing: said valve assembly being characterized by the sealing means as comprising a channel formed on the valve stem and a resilient compressible solid ring of original annular cross section arranged in said channel and having sealing engagement with the walls of the channel and the walls of the valve casing, said ring being constantly maintained under compression in all directions by the walls of said channel and the wall of the valve casing in order thereby to perform its sealing function, and being further characterized by the combination with the sealing means so constituted of an annular flange carried by the valve casing at its outer end and projecting laterally inward into contacting and positively guiding engagement in any position of the valve stem with the portion thereof which projects outwardly beyond the valve casing.

OAKLEY S. PHILLIPS.

REFERENCES CITED

The following references are of record in the file of this patent:

UNITED STATES PATENTS

| Number | Name | Date |
|---|---|---|
| 1,193,011 | Gibbs | Aug. 1, 1916 |
| 2,310,963 | Lauer | Feb. 16, 1943 |